United States Patent
Gernhardt et al.

(10) Patent No.: US 12,430,357 B2
(45) Date of Patent: Sep. 30, 2025

(54) REPLICATION OF UNSTRUCTURED STAGED DATA BETWEEN DATABASE DEPLOYMENTS

(71) Applicant: Snowflake Inc., Bozeman, MT (US)

(72) Inventors: Robert Bengt Benedikt Gernhardt, Seattle, WA (US); Chong Han, Bellevue, WA (US); Nithin Mahesh, Kirkland, WA (US); Aravind Ramarathinam, Sammamish, WA (US); Saurin Shah, Kirkland, WA (US); Yanrui Zhang, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 15 days.

(21) Appl. No.: 18/051,657

(22) Filed: Nov. 1, 2022

(65) Prior Publication Data
US 2023/0401229 A1    Dec. 14, 2023

Related U.S. Application Data

(60) Provisional application No. 63/366,277, filed on Jun. 13, 2022.

(51) Int. Cl.
G06F 16/30    (2019.01)
G06F 16/25    (2019.01)
G06F 16/27    (2019.01)

(52) U.S. Cl.
CPC ............ *G06F 16/27* (2019.01); *G06F 16/256* (2019.01)

(58) Field of Classification Search
CPC ............................... G06F 16/27; G06F 16/256
See application file for complete search history.

(56) References Cited

U.S. PATENT DOCUMENTS

| 9,015,120 B1 * | 4/2015 | Dutch | G06F 11/1451 |
| | | | 707/640 |
| 2013/0151468 A1 * | 6/2013 | Wu | G06F 16/178 |
| | | | 707/614 |
| 2014/0089254 A1 * | 3/2014 | Simon | G06F 16/24524 |
| | | | 707/E17.014 |
| 2014/0172794 A1 * | 6/2014 | Bartholoma | G06F 16/27 |
| | | | 707/634 |
| 2014/0188797 A1 * | 7/2014 | Araki | G06F 16/27 |
| | | | 707/624 |

(Continued)

FOREIGN PATENT DOCUMENTS

WO    WO-2023244972 A1    12/2023

OTHER PUBLICATIONS

"International Application Serial No. PCT/US2023/068294, International Search Report mailed Jul. 12, 2023", 2 pgs.

(Continued)

*Primary Examiner* — Khanh B Pham
(74) *Attorney, Agent, or Firm* — Schwegman Lundberg & Woessner, P.A.

(57) ABSTRACT

The distributed database can implement unstructured data replication using an internal or external storage location. Metadata, such as a directory table that lists the unstructured files, can be replicated across different deployments, followed by replication of the staged data. Replicating the staged data can be implemented by replication of only the stage metadata or replication of the database files between the deployments.

24 Claims, 8 Drawing Sheets

(56) References Cited

U.S. PATENT DOCUMENTS

2017/0193004 A1* 7/2017 Karuppusamy ..... G06F 11/1004

OTHER PUBLICATIONS

"International Application Serial No. PCT/US2023/068294, Written Opinion mailed Jul. 12, 2023", 4 pgs.
"International Application Serial No. PCT/US2023/068294, International Preliminary Report on Patentability mailed Dec. 26, 2024", 6 pgs.

* cited by examiner

600

IDENTIFY STAGED DATA FOR REPLICATION FROM A SOURCE DATABASE DEPLOYMENT OF A NETWORK-BASED DATABASE SYSTEM TO A DESTINATION DATABASE DEPLOYMENT OF THE NETWORK BASED DATABASE SYSTEM
602

REPLICATE A DIRECTORY DATABASE TABLE FROM THE SOURCE DATABASE DEPLOYMENT TO THE DESTINATION DATABASE DEPLOYMENT
604

REPLICATE STAGE METADATA FROM THE SOURCE DATABASE DEPLOYMENT TO THE DESTINATION DATABASE DEPLOYMENT
606

IDENTIFY STAGED DATA FOR REPLICATION FROM A SOURCE DATABASE DEPLOYMENT OF A NETWORK-BASED DATABASE SYSTEM TO A DESTINATION DATABASE DEPLOYMENT OF THE NETWORK BASED DATABASE SYSTEM
702

CREATE A COPY OF A STORAGE DEVICE AT THE DESTINATION DATABASE DEPLOYMENT
704

REPLICATE A DIRECTORY DATABASE TABLE FROM THE SOURCE DATABASE DEPLOYMENT TO THE DESTINATION DATABASE DEPLOYMENT
706

REPLICATE STAGE METADATA AND STAGED DATA FROM THE SOURCE DATABASE DEPLOYMENT TO THE DESTINATION DATABASE DEPLOYMENT
708

*FIG. 7*

REPLICATION OF UNSTRUCTURED STAGED DATA BETWEEN DATABASE DEPLOYMENTS

CROSS REFERENCE TO RELATED APPLICATIONS

The present application claims the benefit of priority of U.S. Provisional Application No. 63/366,277, filed on Jun. 13, 2022, which is incorporated herein by reference in its entirety.

TECHNICAL FIELD

Embodiments of the disclosure relate generally to a network-based database system or a cloud data platform and, more specifically, to replication of database data.

BACKGROUND

Network-based database systems provide their customers with data storage, processing and analytic solutions. Customers initially stage their unstructured data in a storage device (e.g., cloud-based storage device) from which the unstructured staged data may be accessed and loaded into database tables managed by the network-based database systems for use by the customer. The storage device where the data is staged may be either internal or external to the network-based database system.

BRIEF DESCRIPTION OF THE DRAWINGS

The present disclosure will be understood more fully from the detailed description given below and from the accompanying drawings of various embodiments of the disclosure.

FIG. 6 is a flow diagram of a method for external staged data replication between two different database deployments, according to some example embodiments.

FIG. 7 is a flow diagram of a method for internal staged data replication between two different database deployments, according to some example embodiments.

DETAILED DESCRIPTION

Figure 1:
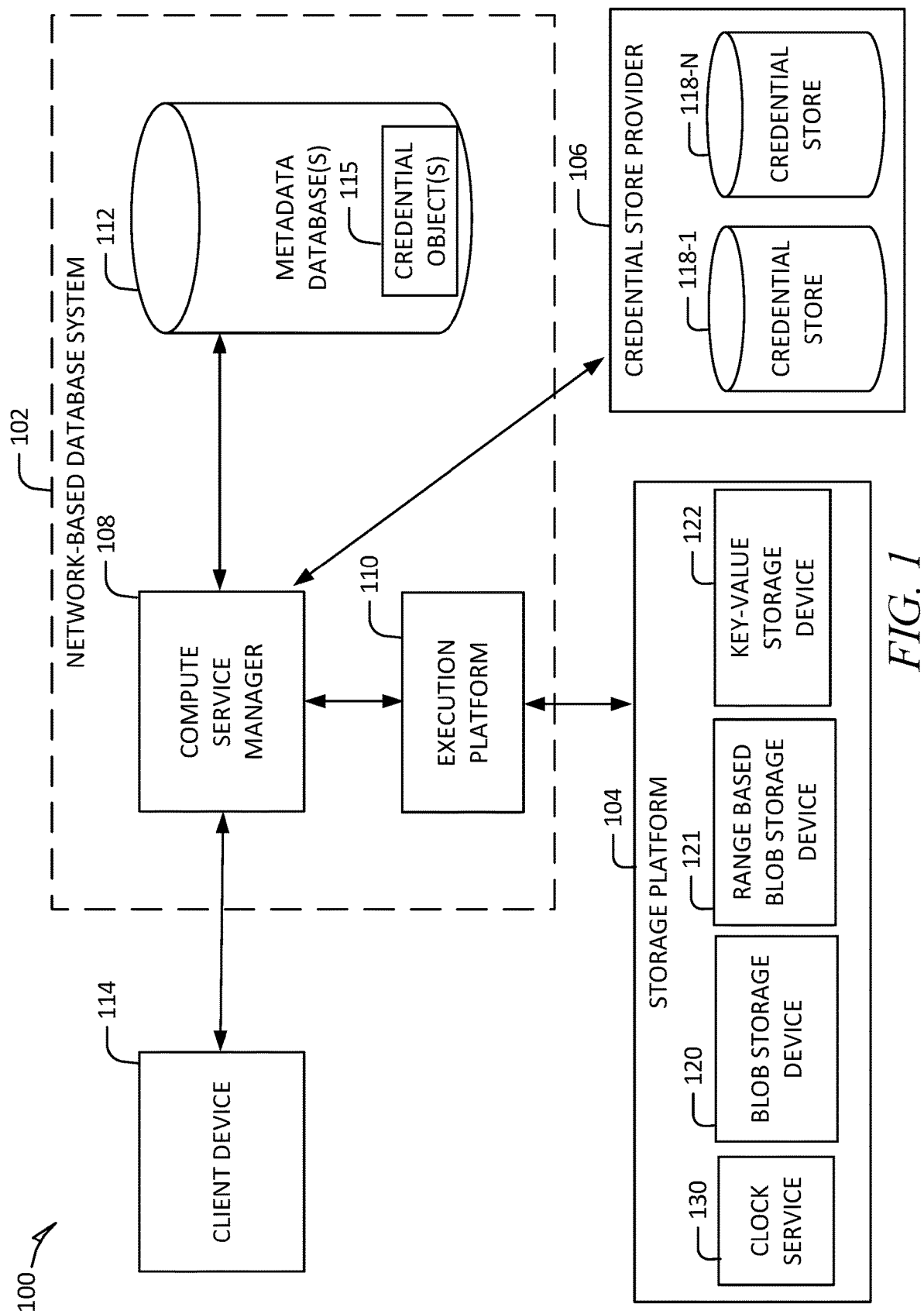
FIG. 1 illustrates an example computing environment that includes a network-based database system in communication with a cloud storage platform, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Network-based database systems provide for data storage, processing and analytic solutions. For example, customers stage (e.g., load) their unstructured data (e.g. files) into a storage device (e.g., Amazon S3, Google Cloud Storage, Microsoft Azure), from which the "staged data" (e.g., unstructured data) can be accessed and loaded into database tables managed by the network-based database system for use by the customers. The storage device where the unstructured data is staged may be either internal to the network-based database system, referred to as an internal stage, or external to the network-based database system, referred to as an external stage. An external stage is a storage device managed by the database customer (e.g., under an account of the database customer) that is external from the network-based database system. In contrast, an internal stage is a storage device managed by the network-based database system (e.g., local disk, infrastructure S3 account of the network-based database system).

While network-based database systems generally allow for the structured data loaded into the tables to be replicated across deployments, they generally do not allow for easy replication of the staged data loaded into the internal or external stages. For example, to replicate the staged data, customers must manually generate scripts which list each file and copy them individually from one database deployment to another database deployment (e.g., East Deployment of the network-based database system to a West Coast Deployment of the network-based database system, Microsoft Azure to Google Cloud). This process is both manually and time intensive and may not be practically possible given the large number of files that are commonly staged by customers.

To alleviate this issue, a network-based database system may utilize a staged data replication service that provides replication functionality to replicate the unstructured staged data from one database deployment to another database deployment. Replication of the staged data may be useful for a variety of purposes, such as disaster recovery, Extract Transform Load (ETL) replication, and incremental replication even in use cases in which the customer has millions of files (e.g., replicating a million files on day 1 from east to west, and then incrementally replicating only a newer set of 100 files from east to west, without replication of the million files).

The staged data replication service replicates the staged data to a remote database deployment by replicating both a directory table that lists the unstructured data items included in the staged data and stage metadata identifying the locations of the unstructured data items in the storage device at the remote database deployment. The remote database deployment may then use the directory table and the staged data to replicate the unstructured data items. In instances where the storage device is a remote stage, the remote deployment may use the stage metadata to identify the locations of the unstructured data items from the storage device and access the unstructured data items at the remote database deployment as needed. In this type embodiment, the unstructured data items may not be copied and stored at the remote database deployment, but rather accessed from the storage device that is external to the network-based database system.

In instances where the storage device is an internal stage, the unstructured data items may be copied and stored at the remote database deployment. For example, a copy of the storage device may be generated at the remote database deployment and the stage metadata may be used to access and copy the unstructured data items from the storage device at the source database deployment to the copy of the storage device at the remote database deployment.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS® S3, Microsoft Azure Blob Storage®, or Google Cloud Storage), and a credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses", or "virtual databases" that can provide OLAP or OLTP database processing). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices, including, for example, blob storage device 120 (e.g., storing data in a micro-partition format of an OLAP database), range-based blob storage device 121 (e.g., storing blob of data, each blob corresponding to a range granule), and key-value storage device 122 (e.g., storing key-value pair data of a OLTP database). In some example embodiments, key-value data (e.g., OLTP data) is replicated from the key-value storage device 122 to the blob storage device 120, as discussed in application Ser. No. 17/249,598, titled "Aggregate and Transactional Networked Database Query Processing," filed on Dec. 14, 2020, which is hereby incorporated in its entirety. In some embodiments, the data storage devices of the storage platform 104 are cloud-based storage devices located in one or more geographic locations. For example, the data storage devices may be part of a public cloud infrastructure or a private cloud infrastructure. The data storage devices may be hard disk drives (HDDs), solid state drives (SSDs), storage clusters, Amazon S3™ storage systems, key-value storage devices (e.g., Foundation Database), or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files (e.g., micro-partitions) using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices in the cloud storage platform 104 (e.g., independently of blob storage device 120). Thus, the computing resources and cache resources are not restricted to specific data storage devices. Instead, all computing resources and all cache resources may retrieve data from, and store data to, any of the data storage resources in the cloud storage platform 104.

Figure 2:
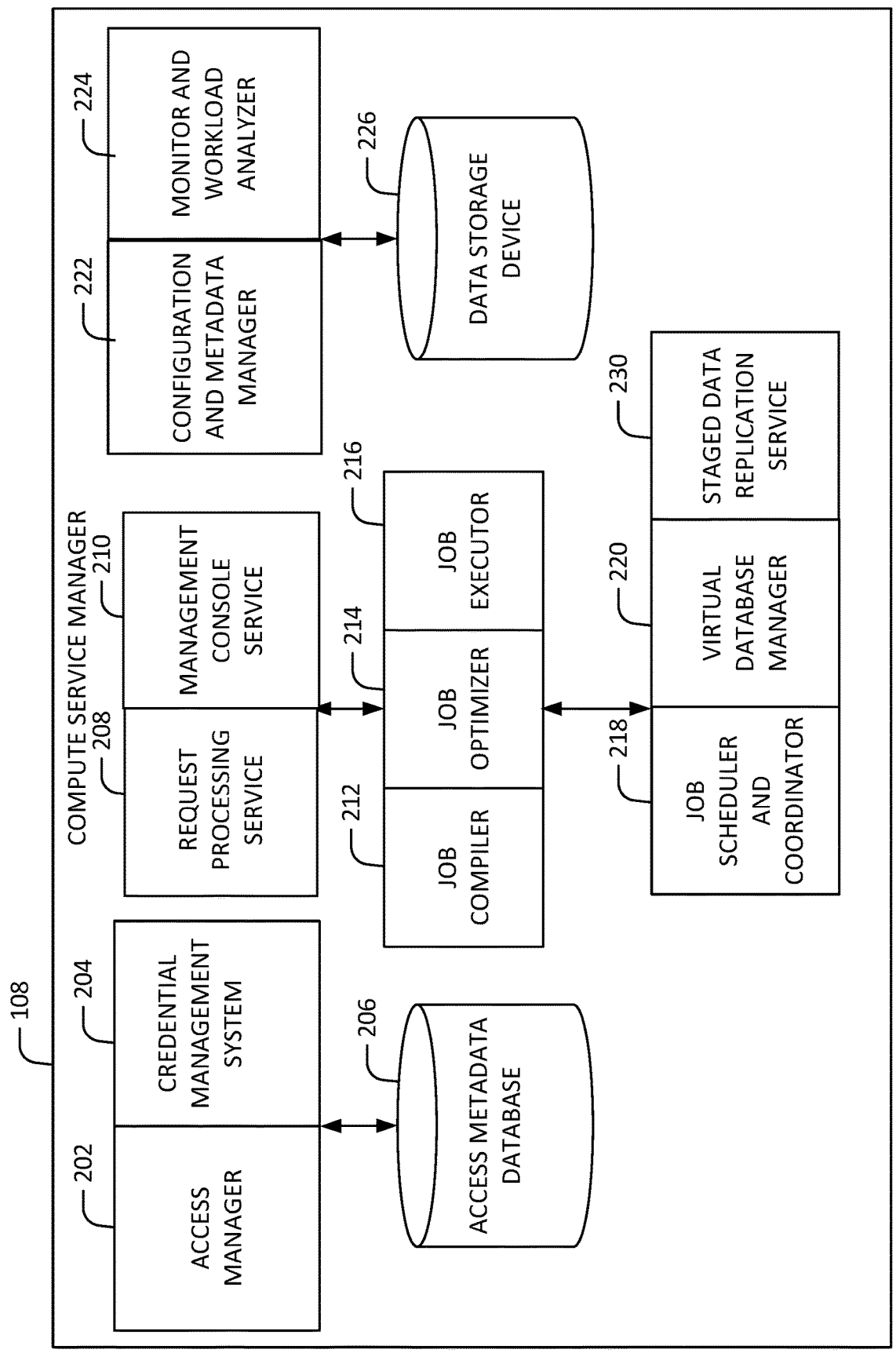
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual database manager 220 manages the operation of multiple virtual databases implemented in the execution platform 110. For example, the virtual database manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files, micro-partition files, need to be accessed to retrieve data for processing a particular task or job. Further details of micro-partitions is discussed in U.S. Pat. No. 10,817,540, which is hereby incorporated in its entirely. A monitor and workload analyzer 224 oversee processes performed by the compute service manager 108 and manages the distribution of tasks (e.g., workload) across the virtual databases and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

The staged data replication service 230 provides functionality to replicate unstructured staged data from one database deployment to another database deployment. Replication of the staged data may be useful for a variety of purposes, such as disaster recovery, Extract Transform Load (ETL) replication, and incremental replication even in use cases in which the customer has millions of files (e.g., replicating a million files on day 1 from east to west, and then incrementally replicating only a newer set of 100 files from east to west, without replication of the million files).

The functionality of the staged data replication service 230 is described in greater detail in relation to FIGS. 4-7.

Figure 3:
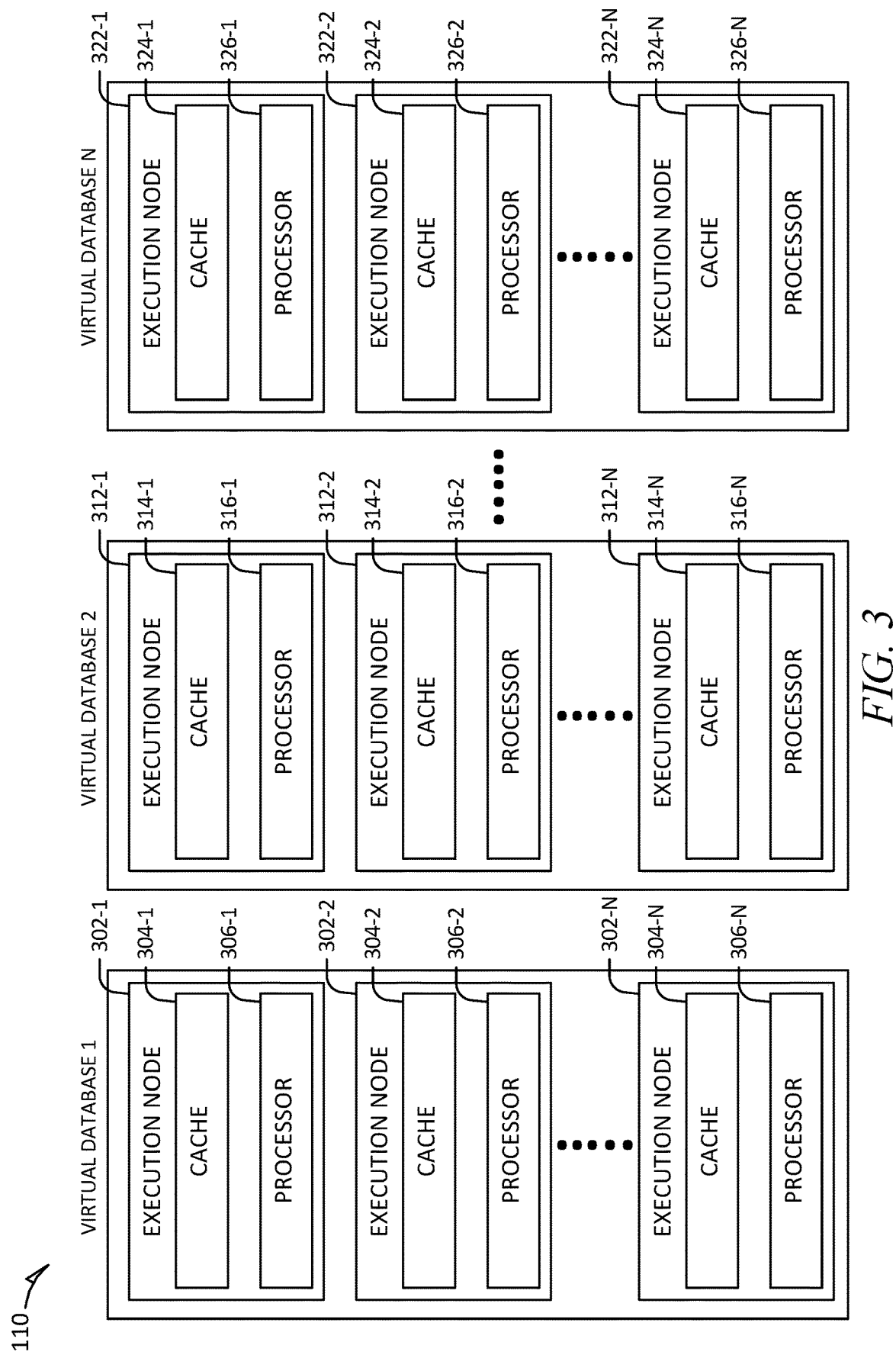
FIG. 3 is a block diagram illustrating components of an execution platform, according to some example embodiments.

FIG. 3 is a block diagram illustrating components of the execution platform 110, in accordance with some embodiments of the present disclosure. As shown in FIG. 3, the execution platform 110 includes multiple virtual database, including virtual database 1, virtual database 2, and virtual database n. Each virtual database includes multiple execution nodes that each include a data cache and a processor. The virtual database can execute multiple tasks in parallel by using the multiple execution nodes. As discussed herein, the execution platform 110 can add new virtual database and drop existing virtual database in real-time based on the current processing needs of the systems and users. This flexibility allows the execution platform 110 to quickly deploy large amounts of computing resources when needed without being forced to continue paying for those computing resources when they are no longer needed. All virtual databases can access data from any data storage device (e.g., any storage device in cloud storage platform 104).

Although each virtual database shown in FIG. 3 includes three execution nodes, a particular virtual database may include any number of execution nodes. Further, the number of execution nodes in a virtual warehouse is dynamic, such that new execution nodes are created when additional demand is present, and existing execution nodes are deleted when they are no longer necessary.

Each virtual database is capable of accessing any of the data storage devices of the storage platform 104, shown in FIG. 1. Thus, the virtual databases are not necessarily assigned to a specific data storage device and, instead, can access data from any of the data storage devices within the cloud storage platform 104. Similarly, each of the execution nodes shown in FIG. 3 can access data from any of the data storage devices in the storage platform 104. In some embodiments, a particular virtual database or a particular execution node may be temporarily assigned to a specific data storage device, but the virtual database or execution node may later access data from any other data storage device.

In the example of FIG. 3, virtual database 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual database may handle data storage and data retrieval tasks associated with an internal service, such as a clustering service, a materialized view refresh service, a file compaction service, a storage procedure service, or a file upgrade service. In other implementations, a particular virtual database may handle data storage and data retrieval tasks associated with a particular data storage system or a particular category of data.

Similar to virtual database 1 discussed above, virtual database 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual database 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual databases 1, 2, and n are associated with the same execution platform 110, the virtual databases may be implemented using multiple computing systems at multiple geographic locations. For example, virtual database 1 can be implemented by a computing system at a first geographic location, while virtual databases 2 and n are implemented by another computing system at a second geographic location. In some embodiments, these different computing systems are cloud-based computing systems maintained by one or more different entities.

Additionally, each virtual database is shown in FIG. 3 as having multiple execution nodes. The multiple execution nodes associated with each virtual database may be implemented using multiple computing systems at multiple geographic locations. For example, an instance of virtual database 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual database.

Execution platform 110 is also fault tolerant. For example, if one virtual database fails, that virtual database is quickly replaced with a different virtual database at a different geographic location.

A particular execution platform 110 may include any number of virtual databases. Additionally, the number of virtual warehouses in a particular execution platform is dynamic, such that new virtual warehouses are created when additional processing and/or caching resources are needed. Similarly, existing virtual databases may be deleted when the resources associated with the virtual warehouse are no longer necessary.

In some embodiments, the virtual databases may operate on the same data in the cloud storage platform 104, but each virtual database has its own execution nodes with independent processing and caching resources. This configuration allows requests on different virtual warehouses to be processed independently and with no interference between the requests. This independent processing, combined with the ability to dynamically add and remove virtual databases, supports the addition of new processing capacity for new users without impacting the performance observed by the existing users.

Figure 4:
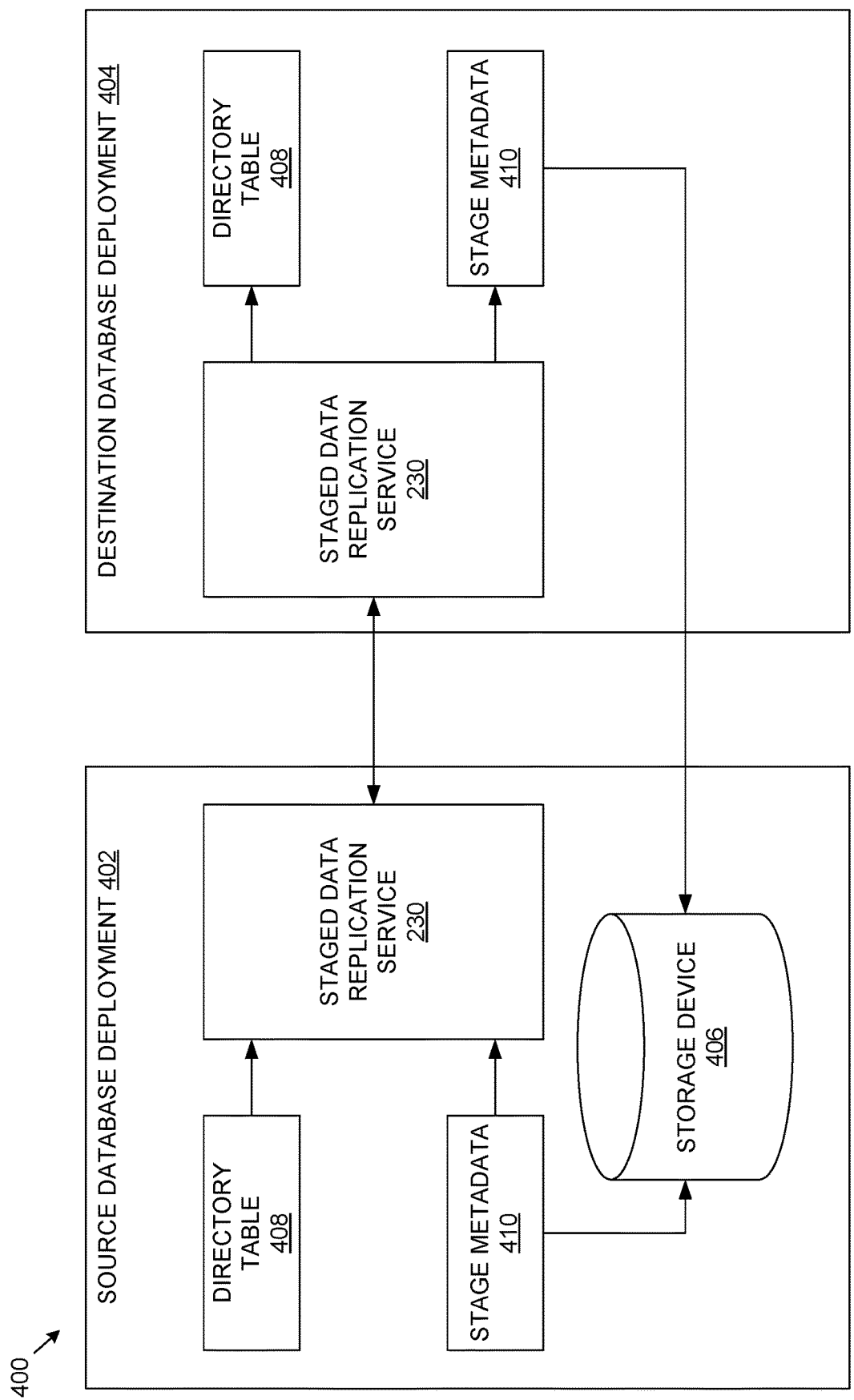
FIG. 4 shows an example database architecture for external staged data replication between two different database deployments, according to some example embodiments.

FIG. 4 shows an example database architecture 400 for external staged data replication between two different database deployments, according to some example embodiments. In the example, of FIG. 4, the customer's staged data at a source database deployment 402 of a network-based database system is replicated to a destination database deployment 404 of the network-based database system. The customer's staged data is loaded to an external stage (e.g., storage device 406) that is external to the network-based database system. For example, the storage device 406 is managed by the database customer (e.g., under an account of the database customer) that is external from the network-based database system (e.g., customer's personal cloud-based object data store, Amazon S3, Microsoft Azure).

As shown, both the source database deployment 402 and the destination database deployment 404 include instances of a staged data replication service 230. The staged data replication service 230 at the source database deployment 402 communicates with the staged data replication service 230 at the destination database deployment 404 to replicate the staged data to the destination database deployment 404. For example, the staged data replication services 230 at the source database deployment 402 accesses a directory table 408 and stage metadata 410 describing the staged data and provides it to the staged data replication services 230 at the destination database deployment 404. The directory table 408 includes a list of the unstructured data items (e.g., files, image files, JSON files, video files, files of unknown structure) included in the staged data. The stage metadata 410 is metadata describing the unstructured data items, including data identifying the locations of the unstructured data items in the storage device 406. For example, the stage metadata 410 may include pointers to the memory locations of the unstructured data items in the storage device 406.

The staged data replication services 230 at the destination database deployment 404 creates copies of the directory table 408 and the stage metadata 410 at the destination database deployment 404. For example, the directory table 408 may be replicated as a regular table at the destination database deployment 404. Once copied to the destination database deployment 404, the directory table 408 and stage metadata 410 may be used to replicate the staged data at the destination database deployment 404. For example, the destination database deployment 404 may use the stage metadata 410 to access the unstructured data items directly from the storage device 406 as needed.

In some embodiments, only the directory table 408 and the stage metadata 410 are copied and stored at the destination database deployment 404 to replicate the staged data, while the staged data itself (e.g., unstructured data items) is accessed from the storage device 406 and not copied and stored at the destination database deployment 404. Alternatively, in some example embodiments, the staged data itself may also be replicated (e.g., transferred over the network) to the destination database deployment 404.

Figure 5:
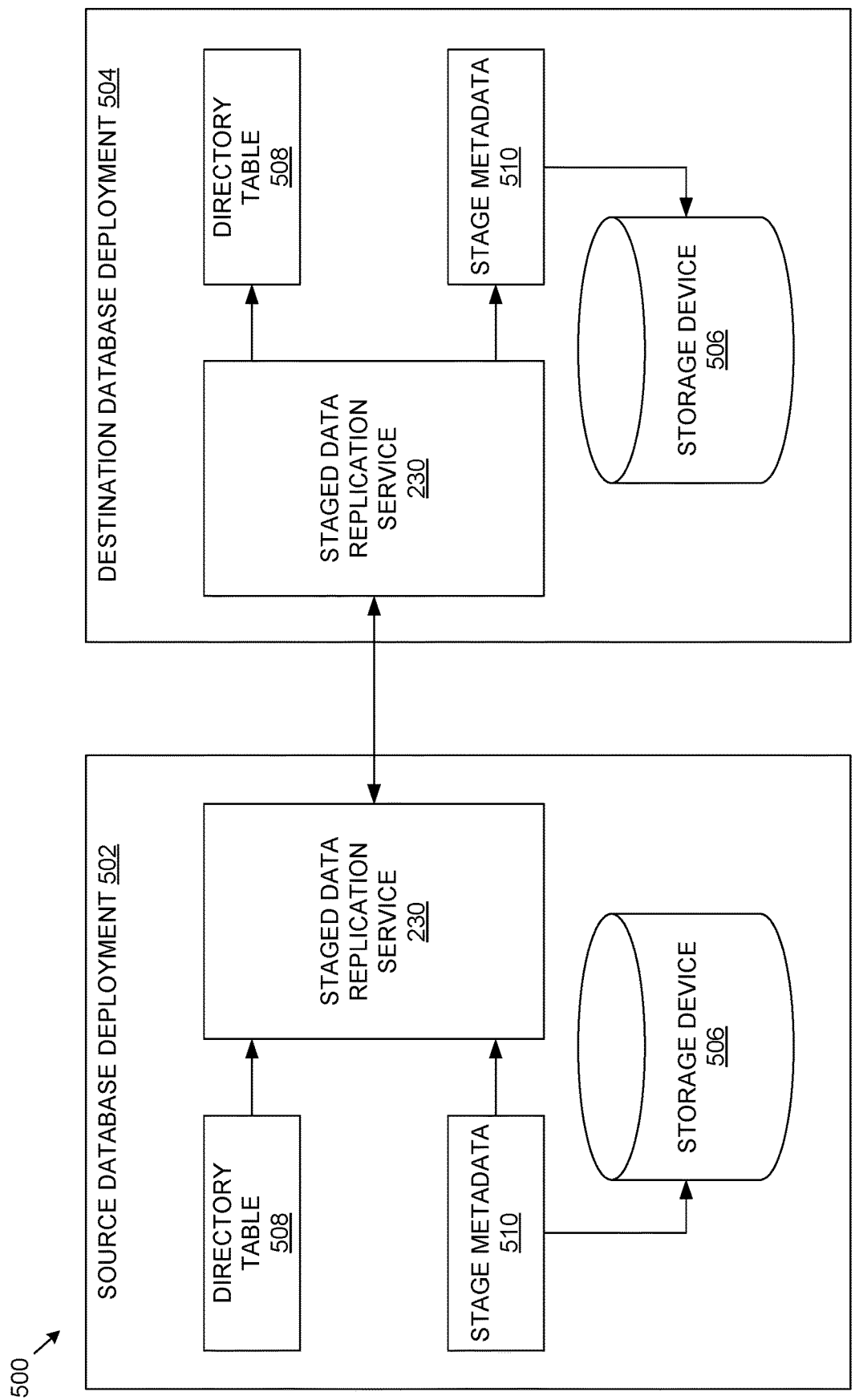
FIG. 5 shows an example database architecture for internal staged data replication between two different database deployments, according to some example embodiments.

FIG. 5 shows an example database architecture 500 for internal staged data replication between two different database deployments, according to some example embodiments. In the example of FIG. 5, the customer's staged data at a source database deployment 502 of a network-based database system is replicated to a destination database deployment 504 of the network-based database system. The customer's staged data is loaded to an internal stage (e.g., storage device 506) that is internal to the network-based database system. For example, the storage device 506 is managed by the network-based database system (e.g., local disk, infrastructure S3 account of the network-based database system).

As shown, both the source database deployment 502 and the destination database deployment 504 include instances of a staged data replication service 230. The staged data replication services 230 at the source database deployment 502 and the destination database deployment 504 communicate with each other to replicate the staged data from the source database deployment 502 to the destination database deployment 504.

For example, the staged data replication services 230 generate a copy of the storage device 506 at the destination database deployment 504. The storage device 506 generated at the destination database deployment 504 is an internal stage that is managed by the network-based database system. Generating the copy of the storage device 506 includes copying the storage device 506 as well as copying any metadata associated with the storage device 506, such as the schema of the internal buckets that exists in the storage device 506, relations of the internal buckets, and the like.

The staged data replication services 230 at the source database deployment 502 also accesses the directory table 508 and stage metadata 510 describing the staged data and provides it to the staged data replication services 230 at the destination database deployment 504. The directory table 508 includes a list of the unstructured data items (e.g., files, image files, JSON files, video files, files of unknown structure) included in the staged data. The stage metadata 510 is metadata describing the unstructured data items, including data identifying the locations of the unstructured data items in the storage device 506. For example, the stage metadata 510 may include pointers to the memory locations of the unstructured data items in the storage device 506.

The staged data replication services 230 at the source database deployment 502 creates copies of the directory table 508 and the stage metadata 510 at the destination database deployment 504. For example, the directory table 508 may be replicated as a regular table at the destination database deployment 504. The staged data replication services 230 at the source database deployment 502 also provides the staged data replication services 230 at the destination database deployment 504 with the staged data (e.g., unstructured data items), which are then copied and stored in the storage device 506 at the destination database deployment 504.

Once copied to the destination database deployment 504, the staged data in storage device 506, directory table 508 and stage metadata 510 are used to replicate the staged data at the destination database deployment 504. For example, the destination database deployment 504 may use the stage metadata 510 to access the unstructured data items from the storage device 506 at the destination database deployment 504.

FIG. 6 is a flow diagram of a method 600 for external staged data replication between two different database deployments, according to some example embodiments. The method 600 may be embodied in computer-readable instructions for execution by one or more hardware components (e.g., one or more processors) such that the operations of the method 600 may be performed by components of network-based database system 102. Accordingly, the method 600 is described below, by way of example with reference thereto. However, it shall be appreciated that the method 600 may be deployed on various other hardware configurations and is not intended to be limited to deployment within the network-based database system 102.

Depending on the embodiment, an operation of the method 600 may be repeated in different ways or involve intervening operations not shown. Though the operations of the method 600 may be depicted and described in a certain order, the order in which the operations are performed may vary among embodiments, including performing certain operations in parallel or performing sets of operations in separate processes.

At operation 602, the staged data replication service 230 identifies staged data for replication from a source database deployment of a network-based database system to a destination deployment of the network-based database system. The staged data is customer data (e.g., unstructured data items) that has been loaded into an external stage for use at the source database deployment. The external stage is a storage device that is external to the network-based database system. For example, the storage device is managed under an account of the database customer that is external from the network-based database system (e.g., customer's personal cloud-based object data store, Amazon S3, Microsoft Azure).

At operation 604, the staged data replication service 230 replicates a directory database table from the source database deployment to the destination database deployment. The directory table includes a list of the unstructured data items (e.g., files, image files, JSON files, video files, files of unknown structure) included in the staged data. The directory table may be replicated as a regular table at the destination database deployment. For example, a copy of the directory table may be created and stored at the destination database deployment.

At operation 606, the staged data replication service 230 replicates stage metadata from the source database deployment to the destination database deployment. The stage metadata is metadata describing the unstructured data items, including data identifying the locations of the unstructured data items in the storage device. For example, the stage metadata may include pointers to the memory locations of the unstructured data items in the storage device.

The staged data replication service 230 creates copies of the directory table and the stage metadata at the destination database deployment. For example, the directory table may be replicated as a regular table at the destination database deployment. Once copied to the destination database deployment, the directory table and stage metadata may be used to replicate the staged data at the destination database deployment. For example, the destination database deployment may use the stage metadata to access the unstructured data items directly from the storage device as needed.

In some embodiments, only the directory table and the stage metadata are copied and stored at the destination database deployment to replicate the staged data, while the staged data itself (e.g., unstructured data items) is accessed from the storage device and not copied and stored at the destination database deployment. Alternatively, in some example embodiments, the staged data itself may also be replicated (e.g., transferred over the network) at the destination database deployment.

FIG. 7 is a flow diagram of a method for internal staged data replication between two different database deployments, according to some example embodiments. The method 700 may be embodied in computer-readable instructions for execution by one or more hardware components (e.g., one or more processors) such that the operations of the method 700 may be performed by components of network-based database system 102. Accordingly, the method 700 is described below, by way of example with reference thereto. However, it shall be appreciated that the method 700 may be deployed on various other hardware configurations and is not intended to be limited to deployment within the network-based database system 102.

Depending on the embodiment, an operation of the method 700 may be repeated in different ways or involve intervening operations not shown. Though the operations of the method 700 may be depicted and described in a certain order, the order in which the operations are performed may vary among embodiments, including performing certain operations in parallel or performing sets of operations in separate processes.

At operation 702, the staged data replication service 230 identifies staged data for replication from a source database deployment of a network-based database system to a destination deployment of the network-based database system. The staged data is customer data (e.g., unstructured data items) that has been loaded into an internal stage for use at the source database deployment. The internal stage is a storage device that is internal to the network-based database system. For example, the storage device 506 is managed by the network-based database system (e.g., local disk, infrastructure S3 account of the network-based database system).

At operation 704, the staged data replication service 230 creates a copy of the storage device at the destination database deployment. The storage device generated at the destination database deployment is an internal stage that is managed by the network-based database system. Generating the copy of the storage device includes copying the storage device as well as copying any metadata associated with the storage device, such as the schema of the internal buckets that exists in the storage device, relations of the internal buckets, and the like.

At operation 706, the staged data replication service 230 replicates a directory database table from the source database deployment to the destination database deployment. The directory table includes a list of the unstructured data items (e.g., files, image files, JSON files, video files, files of unknown structure) included in the staged data. The directory table may be replicated as a regular table at the destination database deployment. For example, a copy of the directory table may be created and stored at the destination database deployment.

At operation 708, the staged data replication service 230 replicates stage metadata and staged data from the source database deployment to the destination database deployment. The stage metadata is metadata describing the unstructured data items, including data identifying the locations of the unstructured data items in the data storage. For example, the stage metadata may include pointers to the memory locations of the unstructured data items in the storage device. The staged data replication service 230 creates a copy of the stage metadata at the destination database deployment and creates copies of the staged data (e.g., unstructured data items), which are stored in the copy of the storage device at the destination database deployment. Once copied to the destination database deployment, the staged data in storage device, directory table and stage metadata are used to replicate the staged data at the destination database deployment. For example, the destination database deployment may use the stage metadata to access the unstructured data items from the data storage at the destination database deployment.

Described implementations of the subject matter can include one or more features, alone or in combination as illustrated below by way of example.

Example 1 is a method comprising: identifying staged data for replication from a first database deployment of a network-based database system to a second database deployment of the network-based database system, the staged data comprising unstructured data items stored in a storage device; replicating, by at least one hardware processor, a directory database table from the first database deployment to the second database deployment, the directory database table comprising a list of the unstructured data items stored in the storage device; and replicating stage metadata from the first database deployment to the second database deployment, the stage metadata identifying locations of the unstructured data items in the storage device, the second database deployment using the directory database table and the stage metadata to replicate the unstructured data items at the second database deployment.

In Example 2, the subject matter of Example, 1 includes, wherein the storage device is an internal stage that is managed by the network-based database system.

In Example 3, the subject matter of any of Examples 1-2 includes, further comprising: causing generation of a second storage device at the second database deployment of the network-based database system, the second database deployment being an internal stage that is managed by the network-based database system.

In Example 4, the subject matter of any of Examples 1-3 includes, wherein the second database deployment replicates the unstructured data items from the storage device to the second storage device at the second database deployment.

In Example 5, the subject matter of any of Examples 1-4 includes, wherein the storage device is a cloud object storage resource.

In Example 6, the subject matter of any of Examples 1-5 includes, wherein the storage device is an external stage that is external to the network-based database system.

In Example 7, the subject matter of any of Examples 1-6 includes, wherein the second database deployment replicates the unstructured data items by accessing the unstructured data items from the storage device that is external to the network-based database system.

In Example 8, the subject matter of any of Examples 1-7 includes, wherein the unstructured data items are not copied and stored at the second database deployment.

In Example 9, the subject matter of any of Examples 1-8 includes, wherein the stage metadata includes pointers to memory locations of the unstructured data items stored in the storage device.

In Example 10, the subject matter of any of Examples 1-9 includes, wherein the second database deployment uses the pointers to access the unstructured data items from the storage device for replication at the second database deployment.

Example 11 is a system comprising: one or more computer processors; and one or more computer-readable mediums storing instructions that, when executed by the one or more computer processors, cause the system to perform operations comprising: identifying staged data for replication from a first database deployment of a network-based database system to a second database deployment of the network-based database system, the staged data comprising unstructured data items stored in a storage device; replicating a directory database table from the first database deployment to the second database deployment, the directory database table comprising a list of the unstructured data items stored in the storage device; and replicating stage metadata from the first database deployment to the second database deployment, the stage metadata identifying locations of the unstructured data items in the storage device, the second database deployment using the directory database table and the stage metadata to replicate the unstructured data items at the second database deployment.

In Example 12, the subject matter of Example 11 includes, wherein the storage device is an internal stage that is managed by the network-based database system.

In Example 13, the subject matter of any of Examples 11-12 includes, the operations further comprising: causing generation of a second storage device at the second database deployment of the network-based database system, the second database deployment being an internal stage that is managed by the network-based database system.

In Example 14, the subject matter of any of Examples 11-13 includes, wherein the second database deployment replicates the unstructured data items from the storage device to the second storage device at the second database deployment.

In Example 15, the subject matter of any of Examples 11-14 includes, wherein the storage device is a cloud object storage resource.

In Example 16, the subject matter of any of Examples 11-15 includes, wherein the storage device is an external stage that is external to the network-based database system.

In Example 17, the subject matter of any of Examples 11-16 includes, wherein the second database deployment replicates the unstructured data items by accessing the unstructured data items from the storage device that is external to the network-based database system.

In Example 18, the subject matter of any of Examples 11-17 includes, wherein the unstructured data items are not copied and stored at the second database deployment.

In Example 19, the subject matter of any of Examples 11-18 includes, wherein the stage metadata includes pointers to memory locations of the unstructured data items stored in the storage device.

In Example 20, the subject matter of any of Examples 11-19 includes, wherein the second database deployment uses the pointers to access the unstructured data items from the storage device for replication at the second database deployment.

Example 21 is a computer-storage medium storing instructions that, when executed by one or more computer processors of one or more computing devices, cause the one or more computing devices to perform operations comprising: identifying staged data for replication from a first database deployment of a network-based database system to a second database deployment of the network-based database system, the staged data comprising unstructured data items stored in a storage device; replicating a directory database table from the first database deployment to the second database deployment, the directory database table comprising a list of the unstructured data items stored in the storage device; and replicating stage metadata from the first database deployment to the second database deployment, the stage metadata identifying locations of the unstructured data items in the storage device, the second database deployment using the directory database table and the stage metadata to replicate the unstructured data items at the second database deployment.

In Example 22, the subject matter of Example 21 includes, wherein the storage device is an internal stage that is managed by the network-based database system.

In Example 23, the subject matter of any of Examples 21-22 includes, the operations further comprising: causing generation of a second storage device at the second database deployment of the network-based database system, the second database deployment being an internal stage that is managed by the network-based database system.

In Example 24, the subject matter of any of Examples 21-23 includes, wherein the second database deployment replicates the unstructured data items from the storage device to the second storage device at the second database deployment.

In Example 25, the subject matter of any of Examples 21-24 includes, wherein the storage device is a cloud object storage resource.

In Example 26, the subject matter of any of Examples 21-25 includes, wherein the storage device is an external stage that is external to the network-based database system.

In Example 27, the subject matter of any of Examples 21-26 includes, wherein the second database deployment replicates the unstructured data items by accessing the unstructured data items from the storage device that is external to the network-based database system.

In Example 28, the subject matter of any of Examples 21-27 includes, wherein the unstructured data items are not copied and stored at the second database deployment.

In Example 29, the subject matter of any of Examples 21-28 includes, wherein the stage metadata includes pointers to memory locations of the unstructured data items stored in the storage device.

In Example 30, the subject matter of any of Examples 21-29 includes, wherein the second database deployment uses the pointers to access the unstructured data items from the storage device for replication at the second database deployment.

Figure 8:
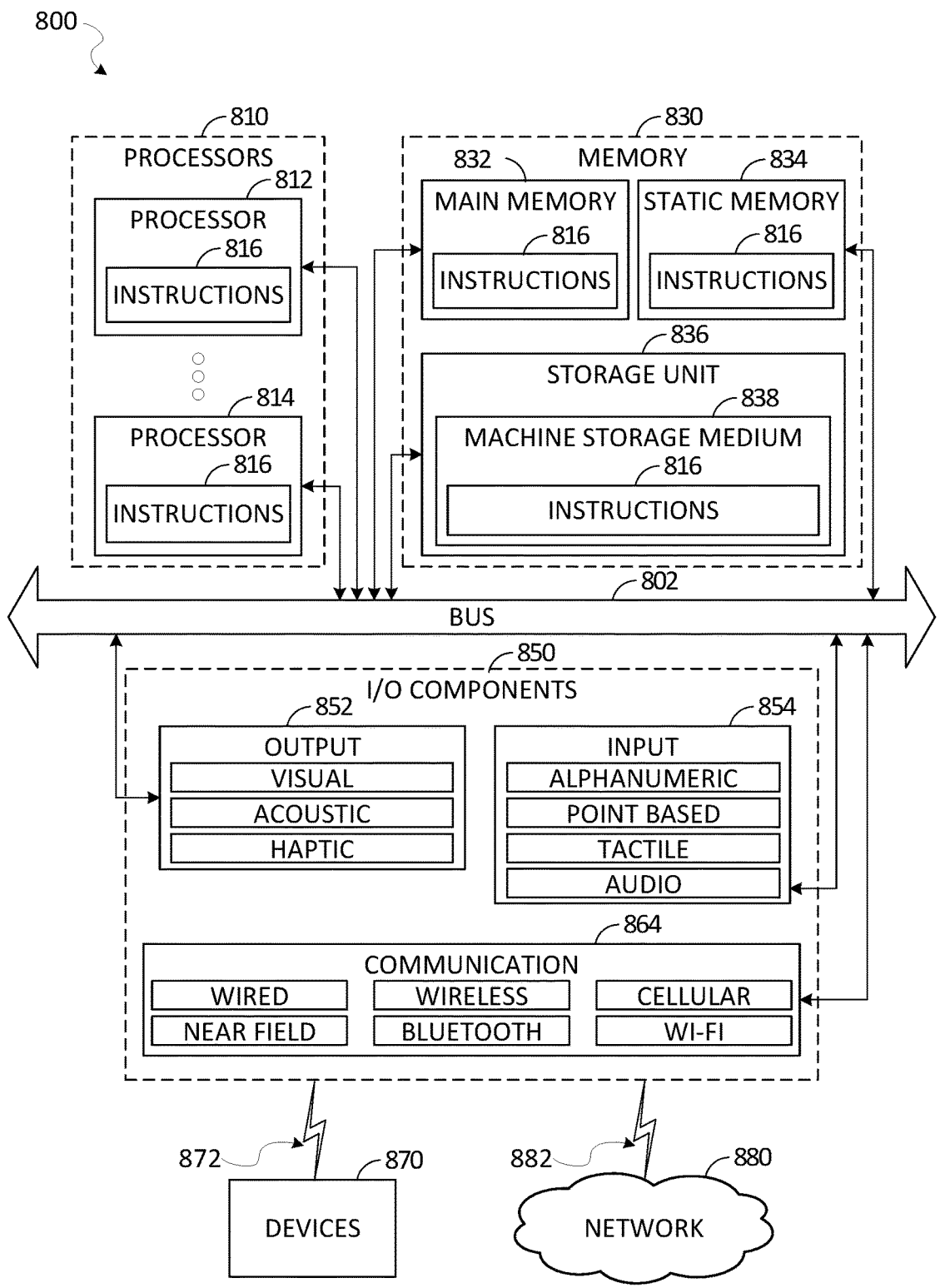
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations shown in FIG. 6 and FIG. 7. In this way, the instructions 816 transform a general, non-programmed machine into a particular machine 800 (e.g., the compute service manager 108 or a node in the execution platform 80) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108 or the execution platform 110, and the devices 870 may include the client device 114 or any other computing device described herein as being in communication with the network-based database system 102 or the cloud storage platform 104.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiment As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
    identifying staged data for replication from a first database deployment of a database system to a second database deployment of the database system, the staged data comprising unstructured data items stored in a storage device of the first database deployment, the second database deployment being a remote deployment from the first database deployment;
    replicating, by at least one hardware processor associated with corresponding replication service instances at the first database deployment and the second database deployment, a directory database table from the first database deployment to the second database deployment, the directory database table comprising a list of the unstructured data items stored in the storage device of the first database deployment, the replicating of the directory database table comprising generating, by the replication service instance at the second database deployment, a copy of the directory database table of the first database deployment;
    replicating stage metadata from the first database deployment to the second database deployment, the stage metadata comprising pointers to memory locations of the unstructured data items stored in the storage device of the first database deployment;
    using, at the second database deployment, the directory database table and at least one of the pointers to the memory locations of the unstructured data items in the storage device to access one or more of the unstructured data items from the storage device of the first database deployment without copying the unstructured data items to the second database deployment;
    based on the directory database table and the stage metadata, enabling incremental replication of additional identified staged data without replication of previously replicated staged data based on a comparison of the directory database table from the first database deployment with the copy of the directory database table at the second database deployment;
    performing staged data replication that comprises incrementally replicating a new set of staged data from the first database deployment to the second database deployment without replicating previously replicated files, the new set of staged data comprising unstructured data items not previously replicated between the first database deployment and the second database deployment;
    maintaining previously replicated unstructured data items at the second database deployment without replication; and
    enabling, based on the staged data, Extract Transform Load (ETL) replication between the first database deployment and the second database deployment.

2. The method of claim 1, wherein the storage device is an internal stage that is managed by the database system, and wherein the replication service instances at the first database deployment and the second database deployment are configured to manage the replicating of the stage metadata.

3. The method of claim 2, further comprising:
    causing generation of a second storage device at the second database deployment of the database system, the second database deployment being the internal stage that is managed by the database system, and wherein the replication service instance at the second database deployment initiates the generation of the second storage device based on the directory database table.

4. The method of claim 3, wherein the second database deployment replicates the unstructured data items from the storage device to the second storage device at the second database deployment, based on the comparison of the directory database table from the first database deployment with the copy of the directory database table at the second database deployment to identify unstructured data items to be replicated.

5. The method of claim 1, wherein the storage device is a cloud object storage resource that is accessible by both the replication service instance at the first database deployment and the replication service instance at the second database deployment.

6. The method of claim 1, wherein the storage device is an external stage that is external to the database system, and wherein the replication service instances at the first database deployment and the second database deployment are configured to access the external stage using the pointers in the stage metadata.

7. The method of claim 6, wherein the second database deployment replicates the unstructured data items by accessing the unstructured data items from the storage device that is external to the database system using the replication service instance at the second database deployment and based on the comparison of the directory database tables to identify unstructured data items not previously replicated.

8. The method of claim 1, wherein the second database deployment uses the pointers to access the unstructured data items from the storage device for replication at the second database deployment, and wherein the replication service instance at the second database deployment maintains a record of accessed unstructured data items to prevent duplicate replication based on the comparison of the directory database tables.

9. A system comprising:
    one or more computer processors; and
    one or more computer-readable mediums storing instructions that, when executed by the one or more computer processors, cause the system to perform operations comprising:
        identifying staged data for replication from a first database deployment of a database system to a second database deployment of the database system, the staged data comprising unstructured data items stored in a storage device of the first database deployment, the second database deployment being a remote deployment from the first database deployment;
        replicating, by at least one of corresponding replication service instances at the first database deployment and the second database deployment, a directory database table from the first database deployment to the second database deployment, the directory database table comprising a list of the unstructured data items stored in the storage device of the first database deployment, the replicating of the directory database table comprising generating, by the replication service instance at the second database deployment, a copy of the directory database table of the first database deployment;

replicating stage metadata from the first database deployment to the second database deployment, the stage metadata comprising pointers to memory locations of the unstructured data items stored in the storage device of the first database deployment;

using, at the second database deployment, the directory database table and at least one of the pointers to the memory locations of the unstructured data items in the storage device to access one or more of the unstructured data items from the storage device of the first database deployment without copying the unstructured data items to the second database deployment;

based on the directory database table and the stage metadata, enabling incremental replication of additional identified staged data without replication of previously replicated staged data based on a comparison of the directory database table from the first database deployment with the copy of the directory database table at the second database deployment;

performing staged data replication that comprises incrementally replicating a new set of staged data from the first database deployment to the second database deployment without replicating previously replicated files, the new set of staged data comprising unstructured data items not previously replicated between the first database deployment and the second database deployment;

maintaining previously replicated unstructured data items at the second database deployment without replication; and enabling, based on the staged data, Extract Transform Load (ETL) replication between the first database deployment and the second database deployment.

10. The system of claim 9, wherein the storage device is an internal stage that is managed by the database system, and wherein the replication service instances at the first database deployment and the second database deployment are configured to manage the replicating of the stage metadata.

11. The system of claim 10, the operations further comprising:

causing generation of a second storage device at the second database deployment of the database system, the second database deployment being the internal stage that is managed by the database system, and wherein the replication service instance at the second database deployment initiates the generation of the second storage device based on the directory database table.

12. The system of claim 11, wherein the second database deployment replicates the unstructured data items from the storage device to the second storage device at the second database deployment, based on the comparison of the directory database table from the first database deployment with the copy of the directory database table at the second database deployment to identify unstructured data items to be replicated.

13. The system of claim 9, wherein the storage device is a cloud object storage resource that is accessible by both the replication service instance at the first database deployment and the replication service instance at the second database deployment.

14. The system of claim 9, wherein the storage device is an external stage that is external to the database system, and wherein the replication service instances at the first database deployment and the second database deployment are configured to access the external stage using the pointers in the stage metadata.

15. The system of claim 14, wherein the second database deployment replicates the unstructured data items by accessing the unstructured data items from the storage device that is external to the database system using the replication service instance at the second database deployment and based on the comparison of the directory database tables to identify unstructured data items not previously replicated.

16. The system of claim 9, wherein the second database deployment uses the pointers to access the unstructured data items from the storage device for replication at the second database deployment, and wherein the replication service instance at the second database deployment maintains a record of accessed unstructured data items to prevent duplicate replication based on the comparison of the directory database tables.

17. A computer-storage medium storing instructions that, when executed by one or more computer processors of one or more computing devices, cause the one or more computing devices to perform operations comprising:

identifying staged data for replication from a first database deployment of a database system to a second database deployment of the database system, the staged data comprising unstructured data items stored in a storage device of the first database deployment, the second database deployment being a remote deployment from the first database deployment;

replicating, by at least one of corresponding replication service instances at the first database deployment and the second database deployment, a directory database table from the first database deployment to the second database deployment, the directory database table comprising a list of the unstructured data items stored in the storage device of the first database deployment, the replicating of the directory database table comprising generating, by the replication service instance at the second database deployment, a copy of the directory database table of the first database deployment;

replicating stage metadata from the first database deployment to the second database deployment, the stage metadata comprising pointers to memory locations of the unstructured data items stored in the storage device of the first database deployment;

using, at the second database deployment, the directory database table and at least one of the pointers to the memory locations of the unstructured data items in the storage device to access one or more of the unstructured data items from the storage device of the first database deployment without copying the unstructured data items to the second database deployment;

based on the directory database table and the stage metadata, enabling incremental replication of additional identified staged data without replication of previously replicated staged data based on a comparison of the directory database table from the first database deployment with the copy of the directory database table at the second database deployment;

performing staged data replication that comprises incrementally replicating a new set of staged data from the first database deployment to the second database deployment without replicating previously replicated files, the new set of staged data comprising unstructured data items not previously replicated between the first database deployment and the second database deployment;

maintaining previously replicated unstructured data items at the second database deployment without replication; and enabling, based on the staged data, Extract Transform Load (ETL) replication between the first database deployment and the second database deployment.

18. The computer-storage medium of claim 17, wherein the storage device is an internal stage that is managed by the database system, and wherein the replication service instances at the first database deployment and the second database deployment are configured to manage the replicating of the stage metadata.

19. The computer-storage medium of claim 18, the operations further comprising:

causing generation of a second storage device at the second database deployment of the database system, the second database deployment being the internal stage that is managed by the database system, and wherein the replication service instance at the second database deployment initiates the generation of the second storage device based on the directory database table.

20. The computer-storage medium of claim 19, wherein the second database deployment replicates the unstructured data items from the storage device to the second storage device at the second database deployment, based on the comparison of the directory database table from the first database deployment with the copy of the directory database table at the second database deployment to identify unstructured data items to be replicated.

21. The computer-storage medium of claim 17, wherein the storage device is a cloud object storage resource that is accessible by both the replication service instance at the first database deployment and the replication service instance at the second database deployment.

22. The computer-storage medium of claim 17, wherein the storage device is an external stage that is external to the database system, and wherein the replication service instances at the first database deployment and the second database deployment are configured to access the external stage using the pointers in the stage metadata.

23. The computer-storage medium of claim 22, wherein the second database deployment replicates the unstructured data items by accessing the unstructured data items from the storage device that is external to the database system using the replication service instance at the second database deployment and based on the comparison of the directory database tables to identify unstructured data items not previously replicated.

24. The computer-storage medium of claim 17, wherein the second database deployment uses the pointers to access the unstructured data items from the storage device for replication at the second database deployment, and wherein the replication service instance at the second database deployment maintains a record of accessed unstructured data items to prevent duplicate replication based on the comparison of the directory database tables.

* * * * *